(12) United States Patent
Zdinak et al.

(10) Patent No.: US 9,625,316 B2
(45) Date of Patent: Apr. 18, 2017

(54) SPECTROMETER TOUCH PANEL GRAPHICAL USER INTERFACE DISPLAY SUPPORT AND MOVEMENT MECHANISM

(71) Applicant: Thermo Electron Scientific Instruments LLC, Madison, WI (US)

(72) Inventors: Paul S. Zdinak, Belleville, WI (US); Michael Jablonski, Madison, WI (US); William A. Bayer, Middleton, WI (US); Taylor A. Powers, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 49 days.

(21) Appl. No.: 14/857,188

(22) Filed: Sep. 17, 2015

(65) Prior Publication Data

US 2016/0033329 A1 Feb. 4, 2016

Related U.S. Application Data

(63) Continuation of application No. 29/537,312, filed on Aug. 25, 2015, now Pat. No. Des. 767,424, which is a continuation of application No. 29/489,553, filed on Apr. 30, 2014, now Pat. No. Des. 739,771.

(51) Int. Cl.
 *G01J 3/02* (2006.01)
(52) U.S. Cl.
 CPC ........... *G01J 3/0291* (2013.01); *G01J 3/0202* (2013.01); *G01J 3/0264* (2013.01)
(58) Field of Classification Search
 CPC ....... G01J 3/0291; G01J 3/0264; G01J 3/0202
 See application file for complete search history.

(56) References Cited

U.S. PATENT DOCUMENTS

| | | | |
|---|---|---|---|
| 4,708,313 A | 11/1987 | Freni, Jr. et al. | |
| 5,738,320 A | 4/1998 | Matos et al. | |
| 5,881,985 A | 3/1999 | Hoenig | |
| 6,585,203 B1 * | 7/2003 | Euker ............... | F16M 13/02 248/200.1 |
| 6,628,382 B2 | 9/2003 | Robertson | |
| 6,809,826 B2 | 10/2004 | Robertson | |
| 7,397,036 B2 | 7/2008 | Robertson et al. | |

(Continued)

FOREIGN PATENT DOCUMENTS

CN 1469218 A 1/2004
CN 1788492 A 7/2006
(Continued)

OTHER PUBLICATIONS

Accuride Data Sheet, Two-Way travel Light Duty Slide, Model 2002, 2 pages, 2002.

(Continued)

*Primary Examiner* — Xanthia C Cunningham
(74) *Attorney, Agent, or Firm* — Ion Abraham

(57) ABSTRACT

The present invention is directed to a spectrophotometer instrument that includes an arm that can swing between a closed position and an open position which is upward and backward of the lower position and wherein the display is moveable between a position behind the arm to a position to a side of the arm. Thus, the features herein provides the instrument user with positioning features to allow for a superior human factors user experience.

18 Claims, 6 Drawing Sheets

(56) References Cited

U.S. PATENT DOCUMENTS

| | | | |
|---|---|---|---|
| D640,581 S | 6/2011 | Sato et al. | |
| 8,189,199 B2 | 5/2012 | Robertson, Jr. et al. | |
| 8,223,338 B2 | 7/2012 | Robertson, Jr. et al. | |
| D693,018 S | 11/2013 | Zdinak et al. | |
| 8,730,466 B2 | 5/2014 | Ashmead et al. | |
| D724,979 S | 3/2015 | Hurzook et al. | |
| 2006/0198094 A1* | 9/2006 | Kano | G06F 1/16 361/679.09 |
| 2009/0174988 A1 | 7/2009 | Roehl | |
| 2012/0186583 A1* | 7/2012 | Drapes | F16M 11/08 128/203.12 |
| 2014/0083225 A1* | 3/2014 | Downs | B60K 37/06 74/471 XY |

FOREIGN PATENT DOCUMENTS

| | | |
|---|---|---|
| JP | 2002200941 A | 7/2002 |
| JP | 2006224688 A | 8/2006 |

OTHER PUBLICATIONS

Denovix, DS-11 Spectrophotometer, Brochure, 2 pages, Version Jun. 2013, 2013.
GE Healthcare, NanoVue(TM) Plus Spectrophotometer, Data file 28/9301-69AC, Brochure, 4 pages, Sep. 2010.
Water Dog Sliders catalog pages, downloaded Jan. 21, 2016, 6 pages.

* cited by examiner

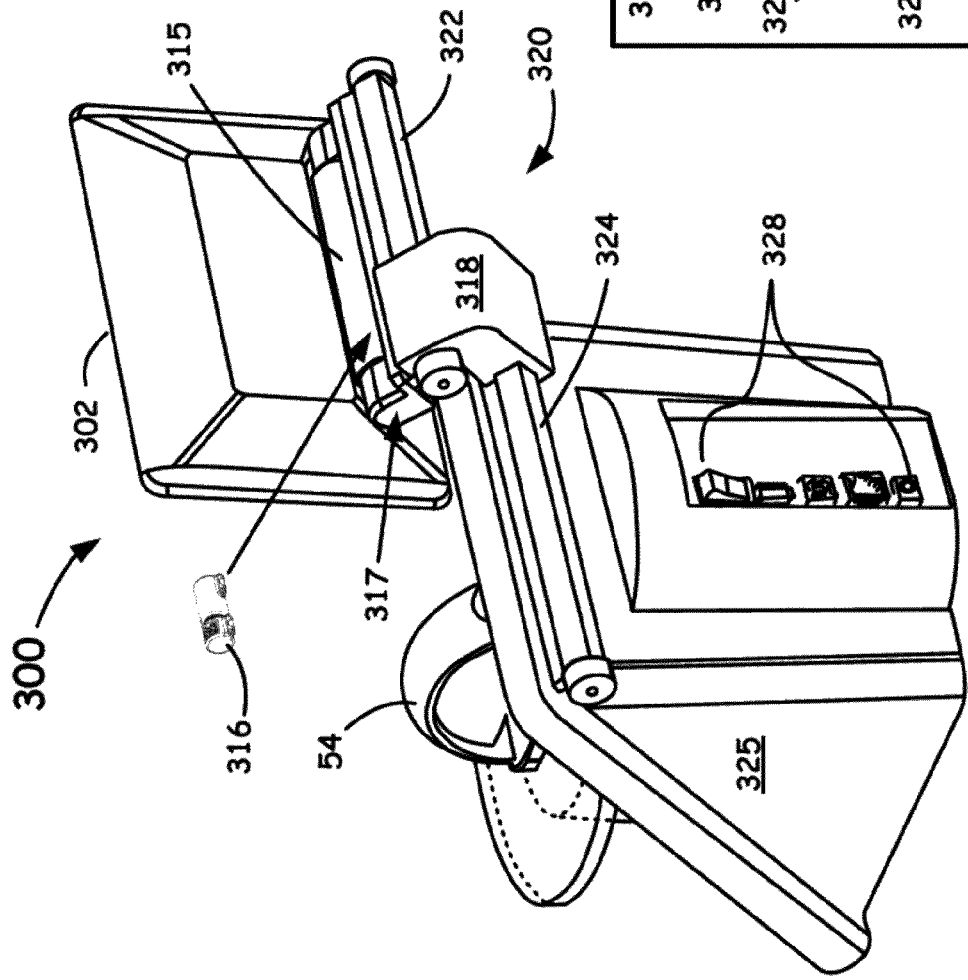
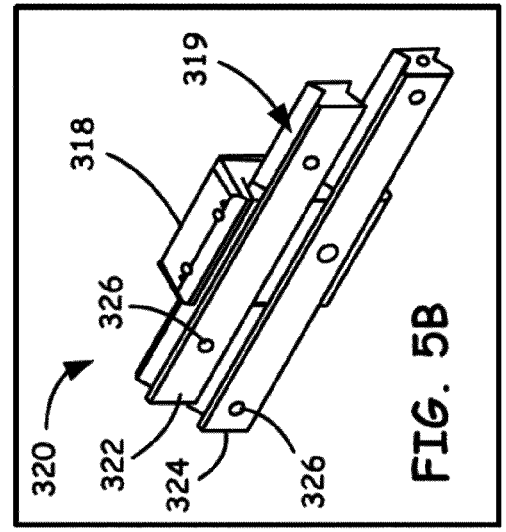
FIG. 5A
FIG. 5B

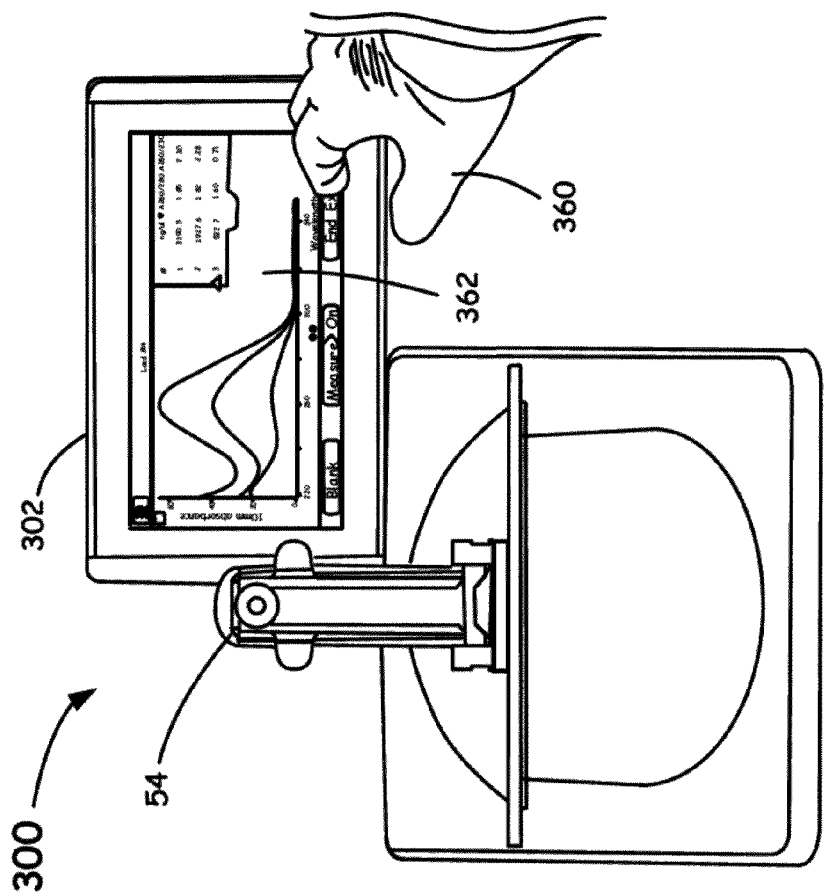
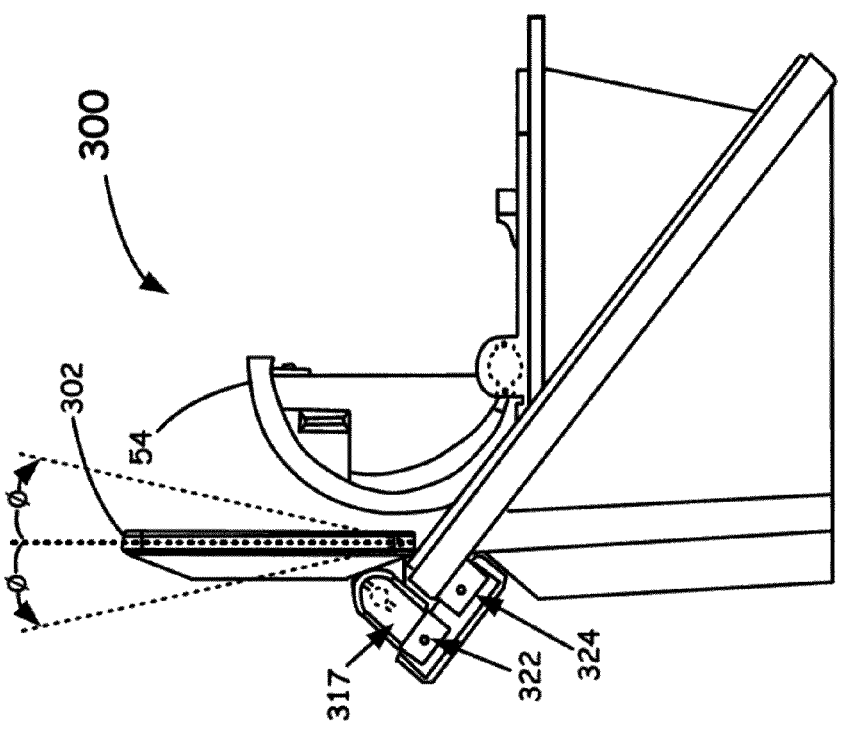
FIG. 6A
FIG. 6B

SPECTROMETER TOUCH PANEL GRAPHICAL USER INTERFACE DISPLAY SUPPORT AND MOVEMENT MECHANISM

RELATED APPLICATION

This application claims the benefit under 35 U.S.C. §120 of U.S. Design Pat. Application No. 29/537,312, entitled: "Spectrometer," filed Aug. 25, 2015, and Design Pat. Application No. 29/489,553, entitled: "Spectrometer," filed Apr. 30, 2014, both of which are incorporated herein in their entirety.

FIELD OF THE INVENTION

The present invention relates to the fields of optical spectrophotometers and their use in optically quantitating and/or characterizing liquids and solutions. More particularly, the present invention is directed to spectrophotometers having a graphical user interface (GUI) display device configured to operate and display results of the optical spectrometer, wherein a moveable assembly may be coupled to the display device so as to provide at least two degrees of freedom of movement for the display device in providing an unencumbered view for right as well as left-handed users of the spectral analysis of different chemicals in solid (e.g., soft) and liquid samples.

BACKGROUND OF THE INVENTION

Discussion of the Related Art

A molecular spectrometer (sometimes referred to as a spectroscope) is a diagnostic instrument wherein a solid, liquid, or gaseous sample is illuminated, often with non-visible light such as light in the infrared region of the spectrum. The light transmitted through the sample is then captured and analyzed to reveal information about the characteristics of the sample. As an example, a sample may be illuminated with infrared light having a known intensity across a range of wavelengths, and the light transmitted by the sample can then be captured for comparison to the light source. Review of the captured spectra can then illustrate the wavelengths at which the illuminating light was absorbed by the sample. The spectrum, and in particular the locations and amplitudes of the peaks therein, can be compared to libraries of previously obtained reference spectra to obtain information about the sample, such as its composition and characteristics. In essence, the spectrum serves as a "fingerprint" for the sample and for the substances therein, and by matching the fingerprint to one or more known fingerprints, the identity and the quantity of the sample might be determined.

In some configurations, the diagnostic instrument is desirably small enough (i.e., having a desired small footprint) and lightweight enough to be effortlessly portable while also being conveniently easy to use by an operator. Background information on such systems can be found in U.S. Pat. No. 6,628,382 to Robertson, issued Sep. 30, 2003, entitled; "Liquid Photometer Using Surface Tension to contain Sample," and U.S. Pat. No. 8,189,199 also to Robertson, issued May 29, 2012, entitled; "Dual Sample Mode Spectrophotometer," the disclosures of which are herein incorporated by reference in their entirety.

It is to be noted that such instruments do not include a coupled display based on the resultant footprint of the instruments. Typical instruments however, such as compact but more often non-compact instruments having a fixed display device, are arranged such that the display is connected in a fixed manner centered on the instrument.

Accordingly, there is a need in the industry to provide a flat panel display with a limited footprint so as to be suitable for such compact or even non-compact diagnostic instruments. Moreover, a flat panel display that allows for at least two degrees of freedom for right handed as well as left handed users is desired. The present embodiments herein are directed to such needs.

SUMMARY OF THE INVENTION

The present embodiments are directed to spectrometer instruments that include a chassis configured with a baseplate; an arm connected at one end to the baseplate so that a forward end of the arm can swing between a closed position adjacent the baseplate and an open position which is upward and backward of a lower position; a display; and a display adjustment support fixture coupled to the display on a first portion of the display adjustment support fixture and coupled to the chassis on a second portion of the display adjustment support fixture, wherein the display is moveable between a position behind the arm to a position to a side of the arm.

Another aspect of the present invention is directed to a spectrometer that includes a chassis configured with a baseplate; an arm connected at one end to the baseplate so that a forward end of the arm can swing between a closed position adjacent the baseplate and an open position which is upward and backward of a lower position; a display; and a display adjustment support fixture coupled to the display on a first portion of the display adjustment support fixture and coupled to the chassis on a second portion of the display adjustment support fixture, wherein the display is pivotally connected to the display adjustment support fixture at one side to the rear of the chassis so as to be behind the arm and so as to enable rotational tilt relative to the chassis.

Accordingly, the embodiments herein are beneficially directed to a touch panel graphical user interface (GUI) display support and movement mechanism configured to enable a wide range of horizontal touch panel display placements, plus angular tilt adjustment that provides the instrument user with extensive interface surface positioning features to allow for a superior human factors user experience.

BRIEF DESCRIPTION OF THE DRAWINGS

FIG. 5A shows beneficial aspects of the rotational and rail movement and support mechanism as coupled to an example instrument herein.

FIG. 5B shows an example of the dual rail and sliding support block configuration to provide horizontal translation of the display of the present embodiments herein.

FIG. 6A shows a side configuration of an example instrument with the arm in an upright position in relationship to the display.

FIG. 6B shows a front view of the configuration shown in FIG. 6A so as to exemplify the novel and beneficial aspect of having a translational movement of the display especially when the arm of the instruments herein is in an open position.

DETAILED DESCRIPTION

Figure 1:
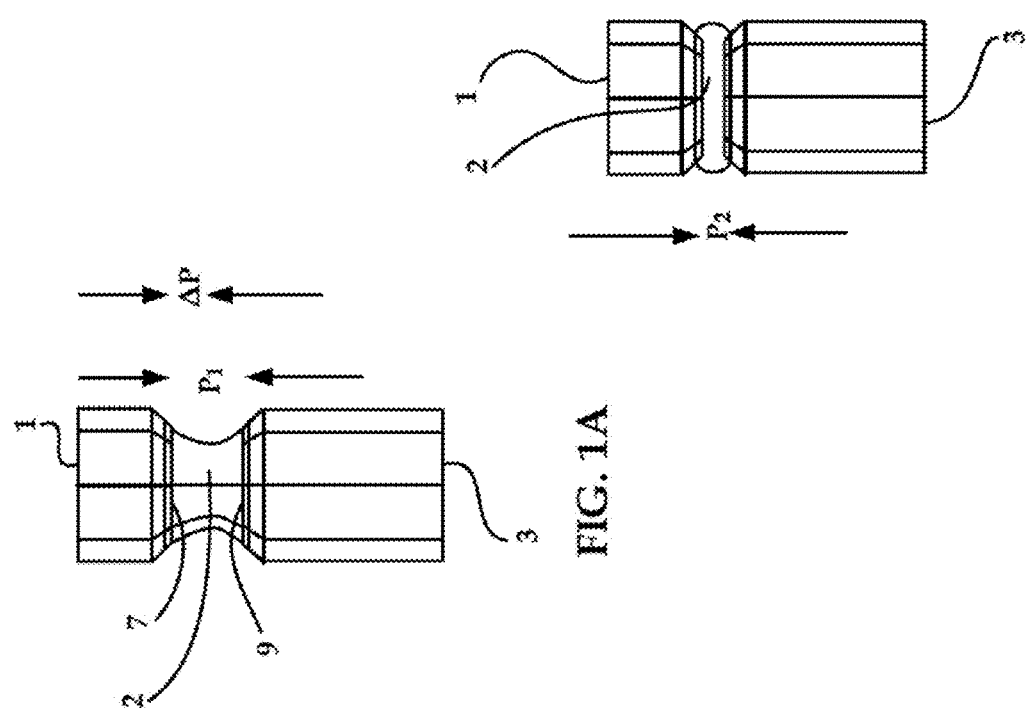
FIG. 1A and FIG. 1B show perspective views of two path lengths to illustrate the differential absorbance path length capability of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

With respect to the aforementioned incorporated patents (i.e., U.S. Pat. No. 6,628,382 and U.S. Pat. No. 8,189,199), the present invention realizes that such a display arrangement is problematic because those instruments include an arm, centered on the footprint of the instrument, which is lifted during parts of operation. Thus during operation, a GUI display screen if available and if fixed in position on the instrument, would be adversely obstructed for some users so as to be cumbersome in operation to include viewing results off of the display screen. In particular, for such a configuration, a user would necessarily frequently either lower the arm (at least to a degree) or move to the side of the instrument to operate the instrument or to readily view results of measurements. The present invention realizes this is simply not a desired option. The present invention also recognizes that a fixed centered display configuration in an instrument of the foregoing type, left handed users often but not necessarily, place items on the left side of the centered fixed display means and conversely right handed users often place items to the right side of the fixed centered display means. It is often but not necessarily a natural function of being a left or right handed person.

General Description

The embodiments described herein are contemplated to provide an optical interrogation apparatus (e.g. spectrometer) that beneficially includes a maneuverable (e.g., up to about +/−45 degrees tilt and at least about 8.5 inches of horizontal travel) display screen desirably configured with a user interface (e.g., a Graphical User Interface (GUI)) so as to not, unless desired, require a keyboard, an additional processor, or even an additional larger display screen. Moreover, the GUI of which includes virtual selective choices allows the instrument(s) herein to remain small enough and lightweight enough, as previously stated, so as to be easily and conveniently transported to another location if desired while simultaneously being substantially sophisticated.

In particular, the instruments herein are often preferably configured as standalone units, wherein the display is configured with a high-resolution, touchscreen interface and as a tablet-based operating system with features for guided method analysis provided to save an operator time and bench space. Moreover, the configurations herein provide for auto-range path-length capabilities to enable accurate measurements for highly concentrated samples without the need for sample dilutions and thus, no prior knowledge of sample concentration needed. In addition, auto-measure features configured with embedded software adds speed and convenience delivering results with full-spectral data in seconds. The instrument(s) herein also are configured so as to enable, for example, output data using an optional thermal printer or tag and transfer data via USB, Ethernet, Wi-Fi or an external computer. Such capabilities enable flexibility for extended analysis and electronic archiving and also enable instant feedback about sample quality with on-demand technical support for guided troubleshooting if needed.

With respect to the maneuverability aspect of the display screen, the design itself provides for fast and easy measurements based on a novel and non-obvious ergonomic design. In particular, the ergonomic design is aided by tilting and sliding means arrangements in the form of rotational, sliding block and dual rail design configurations to enable accommodation capabilities for not only right handed users but left handed users (any user) in operation of the overall instrument disclosed herein.

As briefly described above, left handed users often but not necessarily, place items in the use of diagnostic instruments on the left side of a display means when coupled to, for example, a fixed centered display and conversely right handed users often place items to the right side of the fixed centered display means. To reiterate and to be appreciated when read in light of the disclosure herein, because the present configurations of the instrument includes an arm that is lifted during parts of operation, the display movement configurations herein enable the display to be unobstructed in operation and in viewing ability for right handed users, left handed users or even for any user having a desired display placement preference (e.g., left, right, or even centered). Such a capability enables ease in programming, operating, and I/O operation of which includes instant feedback in the form of on-demand technical support for guided troubleshooting, as discussed above.

Specific Description

As similarly described in U.S. Pat. No. 8,189,199 entitled; "Dual Sample Mode Spectrophotometer," of which is incorporated by reference herein in its entirety as stated above, the embodiments herein also include configurations of a dual mode optical analysis system that can operate in a surfacetension-mode for spectroscopic analysis of small volumes of less than about 10 ul, while equally capable of operating to analyze large-volume samples via configured cells that can include cuvettes, Chemical Oxygen Demand (COD) cuvettes, tubes, custom made vessels, etc.

In typical operation, directed optical radiation is transmitted through a solution or suspension within either mode of the present invention and the incident light is diminished by the absorption of light by colored compounds and/or the scattering of light rays by particulate matter. Such an invention has many uses; it can be used to study pigmented molecules, to monitor the density of bacteria in a culture, and to follow the progress of an enzymatic reaction. As another beneficial example, it can be used to study a chemical analyte in an organic or inorganic medium in an industrial setting, such as for example, for environmental analysis, e.g., using COD cuvettes enables the measure of organic pollution in wastewater using the techniques and apparatus of the present invention. The main requirement is that light be absorbed or scattered by some substance in the sample under investigation.

It is known in the art that in the case of photometry or spectrophotometry, the usual quantity of interest is absorbance, A, which, for liquid samples, is most often defined as:

$$A = -\log_{10}(T) = -\log_{10}(I_R/I_0)$$

where T is the transmittance, $I_R$ the intensity (e.g., power) of light transmitted through the sample being measured and $I_0$ is the intensity of light transmitted through a blank or reference sample, which permits the cuvette based configuration as well as surface tension method of the present invention to be equally beneficial.

In either the surface tension or cuvette-based mode of operation, a user can utilize blank samples with the component analyzed being absent and samples with the component being analyzed present to provide for the absorbance value A, which can be related to the concentration of the component being analyzed by Beer's law which states that for solutions 1 and 2:

$$\frac{A_1}{A_2} = \frac{\text{Concentration}_1}{\text{Concentration}_2}$$

Thus, when compared with a blank sample, the concentration of the component of interest being analyzed can be directly determined from the absorbance A.

Specifically with respect to the surface-tension-mode aspect of the present invention, samples can also be measured with a differential absorbance path as shown in FIGS. 1A and 1B, and as described in incorporated by reference U.S. Pat. No. 6,628,382. Here sample absorbance can be measured by changing the optical path over which the absorbance is measured by measuring the sample at each of one or more path lengths, wherein the difference in path length combined with the difference in transmitted intensity can be used to calculate the sample absorbance. This can be of significant value if the sample is highly absorbing and the accuracy of the path difference for a small path difference can be better determined than the absolute full optical path.

Measurements in a differential mode are taken, as shown in FIG. 1A, where sample 2 is shown with a relatively long path $P_1$ and in FIG. 1B with a relatively short path length $P_2$ between the moveable pedestal or anvil-like surfaces carrying the facing surfaces 7, 9. Thus, by way of the one or more path differences $\Delta P$, the absorbance at the shorter path $P_2$ can be subtracted from the absorbance of one or more of the longer paths to arrive at the absorbance of the sample. These path lengths are measured between two surfaces mutually facing one another, surface 7 of an upper member 1 and surface 9 of a lower member 3. During measurements, light is delivered into the sample through one of the two surfaces and the proportion of the light transmitted through the sample is collected from the sample through the other one of the surfaces. The upper and lower members may be referred to as upper and lower anvils or pedestals, respectively, but can include other platform geometries for containing a liquid sample therebetween without departing from the spirit and scope of the present invention. Thus, the difference in light path length $\Delta P$ $(=|P2-P1|)$ may be used to calculate the optical absorbance of the sample 2 shown in FIGS. 1A-1B, since $\Delta P$ may frequently be known with a greater degree of accuracy and precision than either of $P_1$ and $P_2$.

Specifically with respect to the cuvette-mode of operation, the addition of a cuvette to a pedestal based system offers the user more versatility. Occasionally, a researcher may have a need to do certain sample types or to perform certain ancillary techniques on a sample of interest that do not lend themselves well to a containerless technique. Examples include, but are not limited to, desiring to provide measurements on a sample with an extended (low concentration) range due to longer pathlength, having a non homogenous mixture that requires a certain temperature or agitation, and/or having a diluent sample that was volatile and subject to rapid evaporation.

Accordingly, the novel integrated apparatus of the present invention provides for an instrument that can measure absorbances from about 0.005 up to about 2.0 Absorbance Units for any given pathlength via the amount of light passing through a sample in a surface-tension-held environment with sample volumes of less than about 2 µ-liters (i.e. having path lengths of down to about 10 microns) or through larger sample volumes (e.g., diluted samples) of up to about 50 ml via, for example, tubes, cuvettes, COD cuvettes, custom vessels, etc., so as to result in path lengths from about 2 mm and up to about 100 mm, more often up to about 10 mm.

Beneficial aspects include the ability to make direct comparisons of the surface-tension held configuration of the present invention with the measured values provided by the integrated cuvette configuration. In particular, the present invention enables correction for differences in path lengths between the surface-tension-mode and the vessel configuration by adjustments for path lengths in the former, e.g., path lengths of down to about 10 microns, so as to equate to path lengths of up to about 1 cm or more in the latter. Moreover, another beneficial aspect of the present invention includes providing for a more-ready comparison with data from other commercial absorbance spectrophotometers that are well known by those of ordinary skill in the art.

Figure 2:
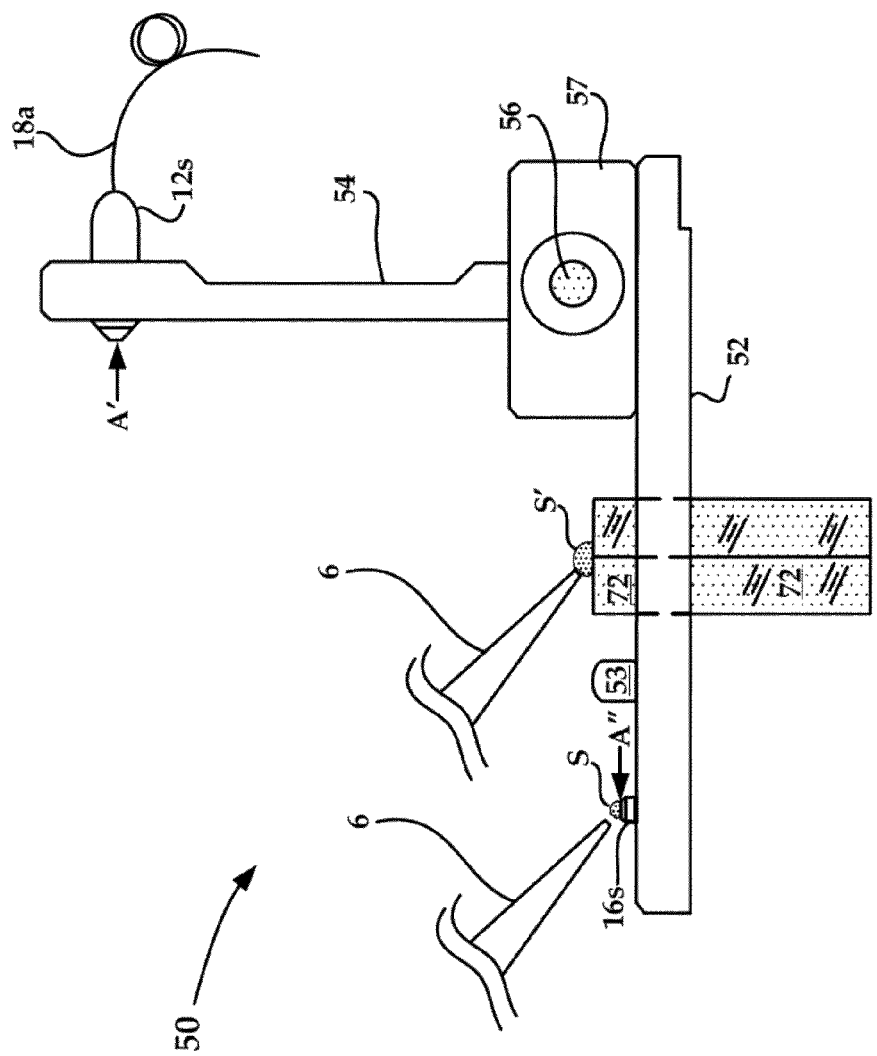
FIG. 2 is a general view of a spectrometer apparatus in the "open position".

Turning back to the drawings, FIG. 2 generally shows a side view of an example apparatus that is utilized in a non-limited manner to merely illustrate to the reader internal operations of the instrument to be described below. FIG. 2 thus comprises a free-space (surface-tension-method) cuvetteless based configuration that can, but not necessarily, be integrated with a vessel (e.g., a cuvette) arrangement in accordance with desired aspects of the present embodiments herein.

Surface Tension Mode

In particular, with respect to the surface tension mode "cuvetteless" based aspects of the present invention, the apparatus, as illustrated in FIG. 2 and generally designated by the reference numeral 50, is shown in an "open" position (i.e., swing arm 54 in the up position) in which a liquid drop analyte or reference sample, denoted by the letter S, of less than about 10 μl, more often less than about 2 μl, is dispensed or aspirated onto a lower platform surface A". As discussed in more detail below, such an "open" position enables easy access to the ends of the surfaces, e.g., surface A", which contain the liquid samples and also enables a user to easily clean such surfaces and to mount a new sample within the apparatus when desired.

Thus, in the "open position" of FIG. 2, the dispensing of a liquid sample S of less than about 10 μl, often less than about 2 μl, can be delivered by way of a pipetting means 6, such as, but not limited to, a Finnpipette® from Thermo-Fisher Scientific of Waltham, Mass. The pipetted liquid is thus delivered to a lower platform A", which is often configured as a pedestal or anvil-like surface that may comprise the end of a custom or commercial SMA fiber optic connector 16s, and of which, also may in some applications, be treated with a material known by those of ordinary skill in the art to prevent over spreading of the applied liquid drop analyte or reference sample S.

Thereafter, upon the application of liquid drop S, the apparatus 50, is angularly moved by a user to be in the "closed position" (not shown), so as to result in the upper pedestal or anvil-like surface A', also often the end of a custom or commercial SMA fiber optic connector 12s, to be brought into contact with liquid drop sample S to capture and contain liquid drop sample S therebetween with lower surface A" in a surface tension mode.

As shown by the open position of FIG. 2 that can result in a closed position (not shown), such an angular movement of the swing arm 54 is enabled by the mechanical coupling of, for example, a hinge rod 56 configured therethrough bores in both the swing arm 54 and in the hinge spacer block 57, with hinge spacer block 57 being coupled to base plate 52.

Accordingly, the fiber optic connector 12s as coupled to an optical fiber 18a, of which contains surface A', and of which is mounted within and passes through a bore in swing arm 54, also angularly rotates with respect to a base plate 52 about hinge rod 56 in order to come into contact with liquid drop sample S. A stop 53 can often be coupled to the base plate 52 and which may be in the form of a pin so as to provide a desired position against which the lower surface of the arm 54 abuts when the arm is rotated so as to provide for the contact and measurement of liquid drop sample S.

Vessel Mode

Also in reference to FIG. 2, it is to be appreciated that when desired, i.e., when measuring large volume samples, a sample of an analyte S' or reference liquid of up to about 50 ml of solution can be disposed within a vessel 72 (e.g., cuvette) in order to provide an overall measurement of path-lengths of up to about 10 mm. Again the application of such an analyte S' or reference liquid can be by way of a commercial pipetting means 6 now configured to provide larger volumes of material (often the vessel 72 is filled on a lab bench (may be but not necessarily via a pipette) and then inserted into an instrument).

Such a vessel 72 is often, but not necessarily, resiliently held in place via means, such as, but not limited to, the configuration described in U.S. Pat. No. 8,189,199. Upon delivery of the large volume of liquid analyte S', and after capping the vessel with an appropriate means (not shown) this system provides optical interrogation of liquid suspension/analyte S' by the system disclosed herein.

Spectrometer Display (Support and Rail Movement Mechanism)

Figure 3:
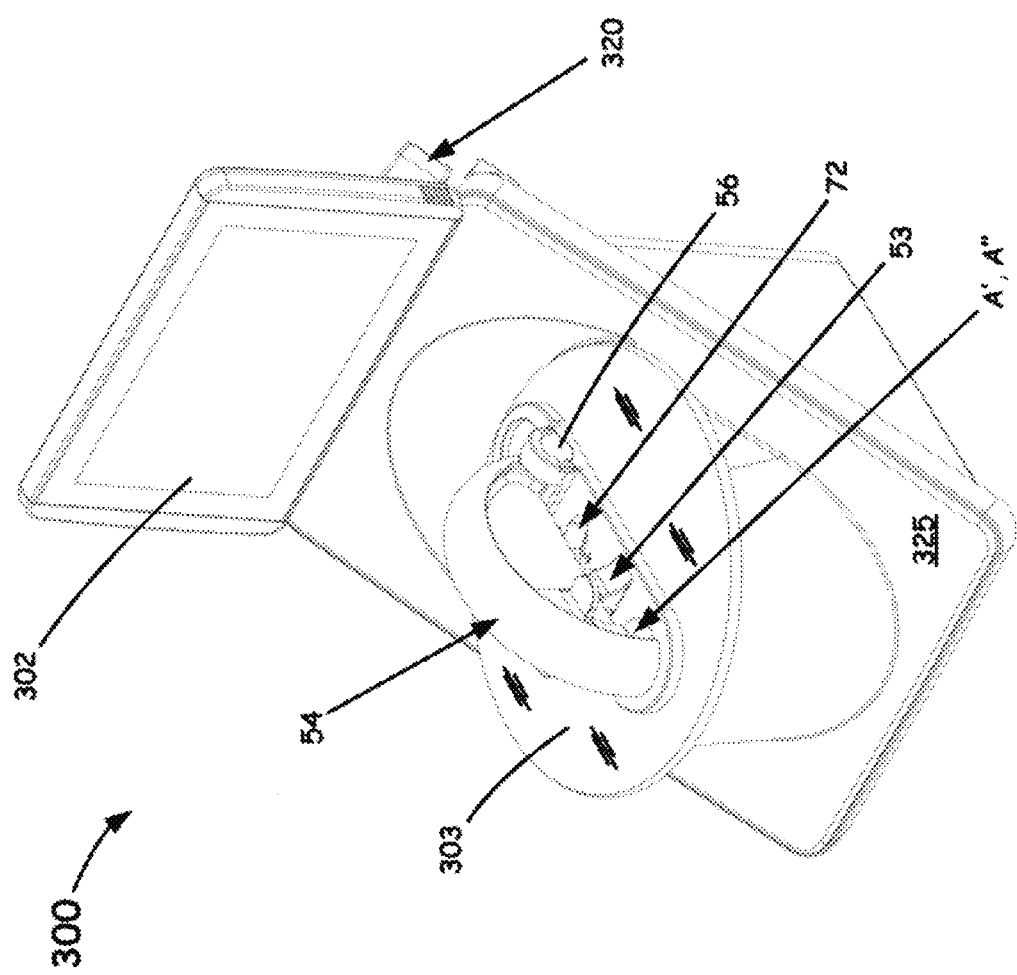
FIG. 3 shows a 3D perspective view of an example spectrometer instrument, as disclosed herein.

The following drawings and related discussion is now to follow so as to describe the novel and non-obviousness design of the embodiments herein. It is to be noted that like numerals for similar components are utilized where warranted. Thus, FIG. 3, generally referenced by the numeral 300, is provided as a 3D perspective view of an example commercial spectrometer instrument form of the instrument 50 shown in FIG. 2 to give the reader an appreciation for the novelty aspects of the present embodiments herein. In particular, FIG. 2 shows an aesthetic version of swing arm 54 shown in the aforementioned "closed" position provided on a chassis 325 (e.g., a housing for the instrument), along with some of, but not all of, the components of instrument 300 for reference. Example components thus include the vessel 72 (e.g., cuvette) location, stop 53, the hinge rod 56 location, upper pedestal A' (not detailed) and lower surface area A" (not detailed) locations, as discussed above for FIG. 2. Importantly, the novel spectrometer display 302 shown in a centered configuration, is now shown moveably coupled to the spectrometer instrument 300, via a support and a rotational and rail movement mechanism 320 (i.e., a display adjustment support fixture) to be discussed in detail below. Also shown is a plate 303 (e.g., a glass plate) to place instrument tools by a user and catch spill over, etc.

Figure 4:
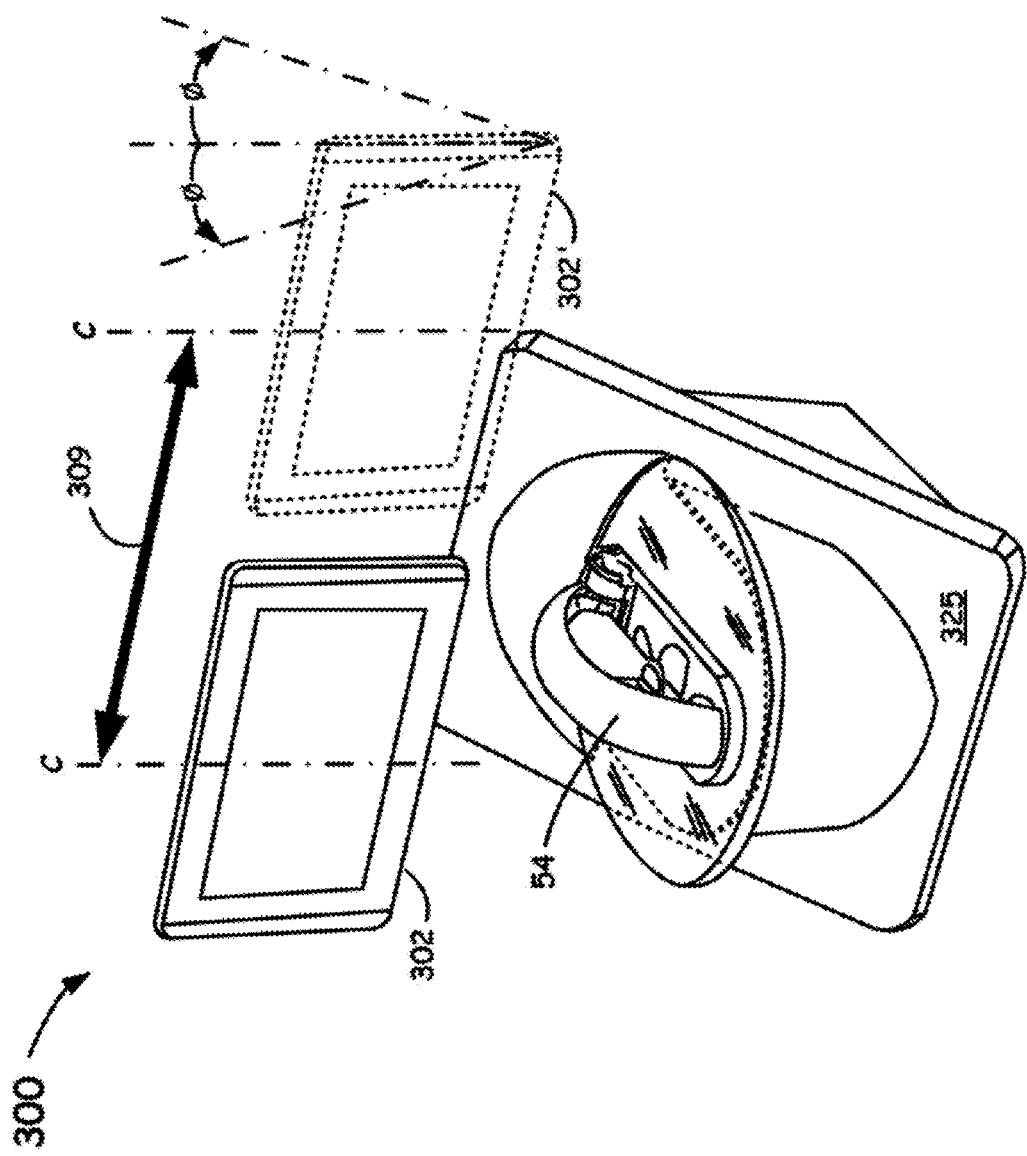
FIG. 4 is a general view of the translation movement capabilities of the display to accommodate in a novel manner, a particular operator of the instruments herein.

FIG. 4, FIG. 5A and FIG. 5B, all in combination are shown to best illustrate the moveable features provided to the display 302 of the instrument 300. FIG. 4 specifically shows the novel ability of the display 302 of the instrument 300 to be translated horizontally 309 (as denoted by the double arrowed indicator) from center to center (denoted by a dashed dotted line and the reference numeral C) to a secondary display position 302' (shown in phantom in FIG. 4). FIG. 4 also shows the display 302 moved rotationally Ø (as also denoted by the double arrowed indicator of Ø), as shown in FIG. 4, via the rotational and rail movement mechanism 320 (i.e., the display adjustment support fixture), as shown in more detail in FIG. 5A and FIG. 5B.

Referring specifically now to FIG. 5A and FIG. 5B, a hinge mechanism 315 (to include a pair of internally arranged rotating "viscous damper devices" 316 (shown external and with only one damper 316 shown for simplicity) is configured to be coupled to a hinge bracket 317 that connects to the flat panel display 302 via fastening means known to those skilled in the art. Hinge bracket 317 is additional attached to a second rail 322 via screw means (e.g., 326 of FIG. 5B). Hinge mechanism 315 allows flat panel display 302 to rotate relative to top slide frame 322. The hinge mechanism 315 with its integrated viscous damper rotating devices 316 provides user adjustable tilting of the touch panel display surface. It is to be noted that the two rotating viscous damper devices 316 are configured with at least up to about a friction torque of 0.50 Nm (4.40 Lb-In) each and wherein each viscous damper device 316 is capable of 360 degrees of rotation.

It is to be noted that one rail, i.e., fixed rail 324, is rigidly attached to the instrument chassis 325 and then the sliding support block 318 with the second sliding rail, i.e., top slide frame 322, is slid onto the fixed rail 324. The sliding support block 318 along with the second sliding rail 322 provide an extensive horizontal movement (as described below) of horizontal travel and support range for the GUI display surface and housing. Moreover, a compression adjuster between the block and the rails is often included to adjust a force required to horizontally move the display. It is to be appreciated that the rail design herein provides optimum support to enable pressure contact with the screen for operation without disturbing the screen placement (i.e., angular and horizontal displacement).

To enable such optimum support, the rail design profile preferably, but not necessarily is configured with a dual dovetail shape or v-grooves 319, (as shown by rails 322 and 324 in FIG. 5B) to provide the desired optimal support for the GUI touch panel display 302 housing as well as maintaining the user set slide position. In particular, the dovetail or v-grooves have a configuration that provides more surface contact area between the sliding block and the rails and thus creates more stability and rigidity for the touch panel display use. While example embodiments are often configured to not require assembly adjustments, additional embodiments of the sliding support block 318 can be configured for fine tunable compression adjustment between the block and the rails to achieve the ideal movement balance of slide and rigidity.

To appreciate the range of movement for the present configurations, the horizontal range of motion via the slide mechanism disclosed herein is configured based on the coupled display. For example, for a preferred 8.5" (in the diagonal) LCD glass touch panel display, the horizontal range is about 4.25" to each side of center so as to keep with the small footprint profile desired for the instrument. It is to be understood however, that while the size of the display screen is desirably an 8.5" screen, the configurations herein are not limited to such a dimension as the dimensions change based on the overall footprint of a given instrument coupled to a given display, such as the preferred LCD display of the present application.

It is also to be noted that while each viscous damper device 316 is capable of 360 degrees of rotation, the radial touch panel surface tilt mechanism is designed with 90 degrees of tilt rotation Ø but is preferably limited to 45 degrees Ø of touch surface rotation. Importantly, the dampened rotational hinge mechanism 315 and the horizontal rail configuration disclosed herein resists movement such that the hinge mechanism 315 and the sliding support block 318 only move when a predetermined amount of manual force is applied to the flat panel display 302. Thus, the hinge mechanism 315 and the sliding support block 318 hold the flat panel display 302 in place when manual force is not being applied. This allows flat panel display 302 to be tilted and horizontally moved manually only when desired and in the directions shown by the arrows (as denoted by numeral 309 and Ø shown in FIG. 4) so as to accommodate the needs of a particular user.

Moreover, by configuring the display with a rotational, sliding block and dual rail design movement means as shown in FIG. 5A and FIG. 5B, the support structure can be totally hidden behind the LCD display module. It is also to be appreciated that the slide configuration, i.e., the sliding block and dual rail design, (as denoted by reference numeral 318, 322, and 324, as shown in FIG. 5B), is configured with at least two extension components so as to enable an extended linear side to side movement which provides a superior human factors experience for the user regardless if they are right or left handed touch panel users. The beneficial point of the present application is however that the display is moveable from one side of the arm and to the rear (in back of) of the arm and as such is not just limited to the dual rail and sliding block configurations disclosed herein as any movement means understood by those skilled in the art can also be utilized without departing from the scope of the invention.

It is also to be noted that while a Liquid Crystal Display (i.e., an LCD display) preferably a flat panel display, is often mentioned herein as the display 302, it is to be appreciated that other display devices, such as, but not limited to, electroluminescent displays, Organic light-emitting diodes (OLED) displays, Field emission displays (FEDs), Single emission displays (SEDs), or other known flat panel displays can be utilized by the embodiments herein where desired and where such devices do not depart from the spirit and scope of the present application.

Also shown in FIG. 5A is an interface 328 to include a power switch and I/O ports shown coupled to the chassis 325, as shown in FIG. 4. Thus the I/O portion of the interface 328 enables various means of communication using known methods to those skilled in the art. For example, in some embodiments, instrument 300 can be connected to other devices via the I/O portion of the interface 328 over other types of networks, including isolated local area networks and/or cellular telephone networks. The connection can also be a wireless connection or a physical coupling. As non-limiting examples of a wireless connection, such an arrangement can include commercial wireless interfaces, such as but not limited to, radio waves (WiFi), infrared (IrDA), or microwave technologies.

The wireless network can, for example, be configured with Bluetooth, which operates in a globally available frequency band (i.e., 2.4 GHz), ensuring communication compatibility worldwide, or wireless network can be Electronic and Electrical Engineers IEEE technologies (e.g., (IEEE) 802.11a or IEEE 802.11b) as the communication means based on its present common use in both business and home environments. Such popular technologies enable users' high-speed access to networks and the Internet. Moreover, other protocols for wireless, such as IEEE 802.15, IEEE 802.16, GPS, 3G and others, may also be configured as a protocol for the communication standard of the present embodiments disclosed herein. Data can also be transferred seamlessly to a PC or Network via, for example a USB port or Wi-Fi for electronic archiving or printing. As another beneficial embodiment, an external keyboard or mouse can also be coupled to the instrument 300 via, for example, Bluetooth® if even greater flexibility is desired.

With respect to a physical wired coupling aspect, the coupling can be by way of a dedicated coupling I/O means, such as an Ethernet cable or the aforementioned USB port to provide, for example, operational data transfer via an embedded software (e.g., firmware) in instrument 300 or instructions received from, in some operations, a coupled processor or aforementioned wireless connectivity.

It is to be noted that the instrument 300 embodiments disclosed herein can incorporate individual software modules, components, and routines in the form of a computer program, procedure, or process written as source code in C, C#, C++, Java, and/or other suitable programming languages. The computer programs, procedures, or processes may be compiled into intermediate, object or machine code and presented for execution by any of the example suitable computing devices discussed above. Various implementations of the source, intermediate, and/or object code and associated data may be stored in one or more computer readable storage media that include read-only memory, random-access memory, magnetic disk storage media, optical storage media, flash memory devices, and/or other suitable media.

A computer-readable medium, in accordance with aspects of the present invention, refers to media known and understood by those of ordinary skill in the art, which have encoded information provided in a form that can be read (i.e., scanned/sensed) by a machine/computer/processor and interpreted by the machine's/computer's/processor's hardware and/or software. It is also to be appreciated that as used herein, the term "computer readable storage medium" excludes propagated signals, per se.

Referring now to FIG. 6A and FIG. 6B, the side configuration shown in FIG. 6A and the front configuration of FIG. 6B best illustrate the beneficial aspect of having the display 302 being maneuverable behind the arm 54 of the instrument 300. To appreciate such a configuration, FIG. 6A specifically shows the tilt aspect of the display 302 (as denoted by Ø via hinge bracket 317), but just as importantly, FIG. 6A in view of FIG. 6B illustrate the ability of the display 302 to be translated along a horizontal path and dual rails 322 and 324 behind the arm so as to not have an obstructed approach for the operator, especially when the arm 54 is in an open upright position during parts of instrument 300 operation, as best exemplified in FIG. 6B.

In particular, while tilt is beneficial with respect to ameliorating, for example, glare or for accommodating a viewing angle for a particular user, the horizontal movement enables ease of preferential use (e.g., for right or left handed operators) in operating the spectrometer instrument 300 embodiments herein. Thus, the display can be translated and positioned behind the arm easily for any user between a position to one side of the arm when the arm is in the open position up to a position to the other side of the arm when the arm is in the open position. However, it is be noted that while positioning the display on one side of the arm when the arm is in the up position up to the other side of the arm is a beneficial embodiment, it is also to be noted that the display, as another beneficial embodiment, can be pivotally connected to the chassis with or without the horizontal translation capabilities disclosed herein in order to be configured at one side to the rear of the chassis and behind the arm such that the display can rotationally tilt relative to the chassis.

Accordingly, for illustrative purposes of the benefit of the display 302 movement herein, FIG. 6B further shows a right handed 360 user (denoted by the hand in the figure) having manually moved the LCD display 302 to the right side of the positioned upright arm 54. By such a manual operation, the user (e.g., a right handed user in this example) can in an unencumbered manner, easily operate the system using, for example, a GUI interface 362 integrated with the display 302, as configured for instrument 300.

The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Such modifications and the like are considered simple modifications that are well within the ability of one of ordinary skill in the art and within the scope and spirit of the invention. Accordingly, many such modifications may be made by one of ordinary skill in the art without departing from the spirit, scope and essence of the invention. Neither the description, drawings nor the terminology is intended to limit the scope of the invention—the invention is defined by the claims.

The invention claimed is:
1. A spectrometer, comprising:
a chassis configured with a baseplate;
an arm connected at one end to the baseplate so that a forward end of the arm can swing between a closed position adjacent the baseplate and an open position which is upward and backward of a lower position;
a display; and
a display adjustment support fixture coupled to the display on a first portion of the display adjustment support fixture and coupled to the chassis on a second portion of the display adjustment support fixture, wherein the display is moveable between a position behind the arm to a position to a side of the arm.

2. The spectrometer of claim 1, wherein the display is moveable via the display adjustment support fixture so as to be translated and positioned behind the arm between a position to one side of the arm when the arm is in the open position up to a position to the other side of the arm.

3. The spectrometer of claim 2, wherein the display adjustment support fixture includes a rail arrangement configured to enable horizontal translation of the display behind the arm and relative to the chassis.

4. The spectrometer of claim 3, wherein the rail arrangement includes a sliding block and a dual rail configuration, wherein the dual-rail configuration comprises a first rail coupled to the chassis and a second rail coupled to the display, and wherein the sliding block is mounted on the first rail to enable sliding movement along a horizontal direction behind the arm and relative to the chassis and additionally configured to enable the second rail to be slidably mounted within so as to also enable sliding movement behind the arm and along a horizontal direction relative to the chassis.

5. The spectrometer of claim 4, wherein the first rail and the second rail that comprise the dual rail arrangement include v-groove or dovetail configurations.

6. The spectrometer of claim 4, wherein the rail arrangement additionally comprises a compression adjuster between the block, the first rail and the second rail so as to adjust a force required to horizontally move the display.

7. The spectrometer of claim 1, wherein the display adjustment support fixture provides a pivotal tilt of the display of up to about +/−45 degrees.

8. The spectrometer of claim 7, wherein the display adjustment support fixture includes a hinge mechanism configured with one or more rotating viscous damper devices to aid in the pivotal tilt.

9. The spectrometer of claim 8, wherein the one or more rotating viscous damper devices are configured with up to about a friction torque of about 4.40 Lb-In.

10. The spectrometer of claim 1, wherein the display is a display device selected from: a Liquid Crystal display (LCD), an electroluminescent display, an Organic light-emitting diodes (OLED) display, a Field emission display (FEDs), and a Single emission display (SEDs).

11. The spectrometer of claim 1, wherein the display includes a Graphical User Interface (GUI).

12. The spectrometer of claim 1, additionally comprising a cuvette holder coupled to the baseplate and positioned between the arm when the arm is in a closed position.

13. A spectrometer, comprising:
a chassis configured with a baseplate;
an arm connected at one end to the baseplate so that a forward end of the arm can swing between a closed position adjacent the baseplate and an open position which is upward and backward of a lower position;
a display; and
a display adjustment support fixture coupled to the display on a first portion of the display adjustment support fixture and coupled to the chassis on a second portion of the display adjustment support fixture, wherein the display is pivotally connected to the display adjustment support fixture at one side to the rear of the chassis so as to be behind the arm and so as to enable rotational tilt relative to the chassis.

14. The spectrometer of claim 13, wherein the display adjustment support fixture provides a pivotal tilt of the display of up to about +/−45 degrees.

15. The spectrometer of claim 14, wherein the display adjustment support fixture includes a hinge mechanism configured with one or more rotating viscous damper devices to aid in the pivotal tilt.

16. The spectrometer of claim 15, wherein the one or more rotating viscous damper devices are configured with up to about a friction torque of about 4.40 Lb-In.

17. The spectrometer of claim 1, wherein the display is a display device selected from: a Liquid Crystal display (LCD), an electroluminescent display, an Organic light-emitting diodes (OLED) display, a Field emission display (FEDs), and a Single emission display (SEDs).

18. The spectrometer of claim 1, wherein the display includes a Graphical User Interface (GUI).

* * * * *